United States Patent [19]
Arrington et al.

[11] Patent Number: 5,462,671
[45] Date of Patent: Oct. 31, 1995

[54] METHOD OF REMOVING HEAVY METALS FROM SOLUTIONS OF AMINO-CARBOXYLIC ACIDS FOR DISPOSAL PURPOSES

[75] Inventors: Stephen T. Arrington; Gary W. Bradley, both of Duncan, Okla.

[73] Assignee: HydroChem Industrial Services, Inc., Houston, Tex.

[21] Appl. No.: 303,250

[22] Filed: Sep. 8, 1994

[51] Int. Cl.$^6$ .................................................. C02F 1/62
[52] U.S. Cl. ........................ 210/717; 210/724; 210/726; 210/912
[58] Field of Search ................................. 210/719, 724, 210/726, 912, 716, 717

[56] References Cited

U.S. PATENT DOCUMENTS

| | | | |
|---|---|---|---|
| 4,675,111 | 6/1987 | Newton et al. | 210/416.1 |
| 5,122,268 | 6/1992 | Burack et al. | 210/202 |
| 5,178,772 | 1/1993 | Daley et al. | 210/721 |

*Primary Examiner*—Neil McCarthy
*Attorney, Agent, or Firm*—Browning, Bushman, Anderson & Brookhart

[57] ABSTRACT

Disclosed is a method to remove heavy metals from amino-carboxylic acid chelate solutions comprising adding nitrous acid to lower the pH of the aqueous solution sufficient to destroy the chelate bonds and release the metal ions and thereafter adding an appropriate strong base and optionally a sulfide salt to precipitate the liberated heavy metals.

20 Claims, No Drawings

METHOD OF REMOVING HEAVY METALS FROM SOLUTIONS OF AMINO-CARBOXYLIC ACIDS FOR DISPOSAL PURPOSES

BACKGROUND OF THE INVENTION

1. Field of the Invention

This invention pertains to a method for removing dissolved heavy metals from aqueous liquids containing heavy metals chelated with amino-carboxylic acids. More particularly, the invention pertains to a process for removing dissolved iron and copper from amino-carboxylic acid chelant solutions.

2. Background

In almost any type of metal equipment in which water is evaporated or heat transfer occurs, insoluble salts and corrosion products deposit upon the surface of the equipment to form scale. The composition of the scale depends upon certain factors such as the water quality, the operating temperature, and the type of metal used. For most ferrous-based process units, the deposits typically comprise iron, nickel, lead, and zinc compounds. In addition, copper compounds are commonly deposited with iron oxide in processes that include units fabricated from copper or copper alloy parts, such as condensers and heat exchangers.

Periodically, scale-prone processes are shut down and chemically cleaned to remove the accumulated scale deposits. In most cleaning operations, the scale is contacted with a mineral acid first, to dissolve the hard deposits. Afterwards, an aqueous amino-carboxylic acid solution is typically added to sequester the released metal ions in the form of metal complexes. These complexes are soluble over a wide pH range which facilitates removal of the scale as an aqueous waste effluent.

One problem with this treatment, though, is that once the scale is removed, the resultant chelant/metal liquid is not easily disposed due to the high solubility of the metals in solution. Consequently, there exists a need for a safe and efficient method of removing the metals from amino-carboxylic acid chelate solutions for proper waste disposal.

SUMMARY OF THE INVENTION

The present invention is directed toward a method for removing dissolved metals from an amino-carboxylic acid chelate solution wherein nitrous acid ($HNO_2$) is first introduced to the aqueous solution to destroy the chelate bonds and release the metal ions, followed by the addition of an appropriate strong base and optionally a sulfide salt such as $Na_2S$ to precipitate the liberated heavy metals. Essentially, the nitrous acid breaks down the amino-carboxylic acid chelates into lower order organic substituents such as alcohols and alkenes. Since these reaction products possess limited chelating ability, the metals in solution are easily precipitated and removed for disposal by the addition of an appropriate base or salt.

DETAILED DESCRIPTION OF THE INVENTION

The present method is highly effective at removing dissolved iron and copper from amino-carboxylic acid chelate solutions, such as those derived from industrial scale-removal operations. Examples of amino-carboxylic acids which are suitable for use in accordance with the present invention include, but are not limited to, ethylenediamine-tetraacetic acid (EDTA), nitrilotriacetic acid (NTA), and aminotrimethylene-phosphonic acid (ATMP).

Generally, the present invention can be used in all applications requiring removal of metals from amino-carboxylic acid chelate effluents.

In the present invention, the nitrous acid that is introduced to the aqueous chelate system is added in sufficient quantity to lower the system pH to a range between about 3.0 and about 5.0. The nitrous acid may be introduced either as a pure liquid or in the form of a nitrite salt, which is subsequently converted to $HNO_2$ by the addition of an acid. Examples of suitable nitrite salts which may be used include sodium nitrite or potassium nitrite. Suitable acids which may be used to convert the nitrite salt to $HNO_2$ include HCl, $H_2SO_4$ and $H_3PO_4$.

When nitrite salt is used, the salt preferably comprises between about 1% and about 10% by weight of the aqueous chelate solution. Furthermore, sufficient acid must be added to the solution to maintain the system pH between about 3.0 and about 5.0.

Upon the addition of the nitrous acid, the aqueous system is preferably mixed by mechanical means to ensure uniform dispersal of the acidic mixture in solution. Examples of suitable mixing apparatus are well known in the art and include, but are not limited to, stirrers and shakers.

The nitrous acid is allowed to react with the aqueous chelate system until the chelant is essentially destroyed. Thereafter, sufficient base, either in solid or liquid form, is added to raise the pH of the solution to between about 10.0 and about 13.0. Examples of suitable bases which can be used include NaOH, $Ca(OH)_2$ and KOH. Mechanical mixing may also be employed to ensure a homogeneous solution.

As the base reacts with the aqueous solution, dissolved metals will begin to precipitate as the insoluble hydroxides flocculate and settle. The solutions should be allowed to react until the precipitation of the metals is as complete as desired as determined by periodic analysis for dissolved metal content. Once the dissolved metals are substantially precipitated, the metal hydroxide solids may be physically removed from the liquid effluent by filtration, centrifugation, or other means known in the art.

The resultant aqueous solution may be subsequently treated with an appropriate sulfide salt such as sodium or potassium or calcium sulfide to precipitate the copper and any residual metals. The salt is preferably added in an amount of from about 0.05 to about 1 weight percent of the aqueous solution. The precipitate which forms is mostly cuprous sulfide ($Cu_2S$) and, like the metal hydroxide precipitate, will flocculate and settle in the reaction vessel. The solids may then be separated from the aqueous solution by filtration, centrifugation, or other means known in the art.

As a final treatment, the aqueous solution may be passed through activated carbon to remove at least a portion of any trace metals present and other surface active organics.

The filtrate can then be disposed of in accordance with accepted discharge criteria since the solution is generally considered non-pollutant after metal/organic removal. Furthermore, the precipitated solids may be disposed of in a conventional landfill since the precipitates are generally considered to be stable salts that would not be subject to leaching or other movement in the soil.

Utilizing the above procedure, dissolved metal concentrations in amino-carboxylic acid chelate solutions may be reduced to less than 1 part per million (ppm). Thus, this procedure should be useful in disposing of industrial solvents, as well as other metal/amino-carboxylic acid chelate effluents.

To further illustrate the present invention, but not by way of limitation, the following examples are provided.

EXPERIMENTAL

In all samples, the representative "waste" solutions were prepared with 0.5% Fe and 0.05% Cu (by weight). Upon addition of $NaNO_2$, HCl was added to each sample to obtain a pH of approximately 4. These samples were allowed to reach equilibrium for approximately 30 minutes. Thereafter, NaOH was added to the samples to obtain a pH of approximately 12. These samples were allowed to reach equilibrium for approximately 16 hours. Upon precipitation, the iron hydroxide solids were removed by vacuum filtration, and the effluent was further treated with $Na_2S$ and allowed to equilibrate for 16 hours. Finally, the copper and residual iron solids were removed by vacuum filtration and the effluent was passed through activated carbon as a final polishing step. The results are tabulated below.

| Chelant | Percent Sodium Nitrite Added | Fe (mg per liter) | Cu (mg per liter) |
| --- | --- | --- | --- |
| 2.35% NTA† + 0.41% ATMP‡ acid | 5 | 0.6 | 0.3 |
| 2.35% NTA† + 0.41% ATMP‡ acid | 1.43 | 0.35 | 0.27 |
| 2.35% NTA† + 0.41% ATMP‡ acid | 0.95 | 0.33 | 0.25 |
| 2.35% NTA† + 0.41% ATMP‡ acid | 0.475 | 0.41 | 0.31 |
| 4% EDTA | 0 | 10.7 | 0.4 |
| 4% EDTA | 0.48 | 5.5 | 0.4 |
| 4% EDTA | 0.95 | 0.41 | 0.21 |
| 4% EDTA | 1.90 | 0.42 | 0.25 |
| 4% EDTA | 3.80 | 0.44 | 0.29 |

†nitrilotriacetic acid
‡aminotrimethylenephosphonic acid

What is claimed is:

1. A method for removing dissolved metals from an aqueous solution containing said metals complexed with amino-carboxylic acid chelates, said method comprising:
   (a) contacting the aqueous solution with sufficient nitrous acid for a time sufficient to uncomplex said metals; and
   (b) adding a strong base to the aqueous solution to precipitate the uncomplexed metals from solution.

2. The method of claim 1 wherein said nitrous acid is added in sufficient quantity to lower the pH of said aqueous solution to a range between about 3.0 and about 5.0.

3. The method of claim 2 wherein said nitrous acid is a liquid.

4. The method of claim 2 wherein said nitrous acid is prepared in situ by adding nitrite salt to an acid.

5. The method of claim 4 wherein said nitrite salt is sodium nitrite or potassium nitrite.

6. The method of claim 5 wherein said nitrite salt is added in sufficient quantity to comprise between about 1% by weight and about 10% by weight of the solution.

7. The method of claim 4 wherein said acid is hydrochloric acid (HCl), sulfuric acid ($H_2SO_4$) or phosphoric acid ($H_3PO_4$).

8. The method of claim 1 wherein said time for acid reaction is about one hour.

9. The method of claim 1 wherein said base is sodium hydroxide (NaOH), calcium hydroxide ($Ca(OH)_2$) or potassium hydroxide (KOH).

10. The method of claim 1 wherein said quantity of said base raises the pH of the aqueous solution to between about 10.0 and about 13.0.

11. The method of claim 1 which further comprises adding a sulfide salt to said aqueous solution in a sufficient quantity to form a metal sulfide precipitate.

12. The method of claim 11 wherein said quantity of $Na_2S$ comprises between about 0.05 to about 1.0 weight percent of the aqueous solution.

13. The method of claim 1 further comprising removing said precipitates from said aqueous solution by mechanical means.

14. The method of claim 13 wherein said mechanical means employs filtration or centrifugation.

15. The method of claim 13 further comprising passing said aqueous solution from which said precipitates have been removed through activated carbon.

16. The method defined by claim 1 wherein said aqueous solution is waste effluent produced by the removal of scale from ferrous metal surfaces.

17. The method of claim 1 wherein said metals are iron and copper.

18. The method of claim 1 wherein said amino-carboxylic acid is selected from the group consisting of ethylenediaminetetraacetic acid (EDTA), nitrilotriacetic acid (NTA), and aminotrimethylenephosphonic acid (ATMP).

19. A method for removing metals from an aqueous solution containing complexes of said metals with amino-carboxylic acid chelates, said method comprising:
   adding sufficient nitrous acid to said aqueous solution to maintain the pH range of said aqueous solution between about 3.0 and about 5.0;
   contacting said complexes with said nitrous acid within said pH range for a time sufficient to react said nitrous acid with said chelates and uncomplex said metals to form a metal ion-containing aqueous solution;
   adding sufficient strong base to raise the pH of said metal ion-containing aqueous solution to between about 10.0 and about 13.0 to precipitate metal ion hydroxides; and
   optionally, adding sufficient sulfide to said metal ion-containing aqueous solution to precipitate metal ion sulfides.

20. A method for removing metals from an aqueous solution containing complexes of said metals with amino-carboxylic acid chelates, said method comprising:
   contacting said complexes with sufficient nitrous acid for a time sufficient to react said nitrous acid with said chelates and uncomplex said metals to form a metal ion-containing aqueous solution; and
   precipitating said metal ions from said metal ion-containing aqueous solution.

* * * * *